Feb. 3, 1942.  A. HENDERSON  2,271,549
PIPE JOINT PROTECTOR
Filed Aug. 15, 1940
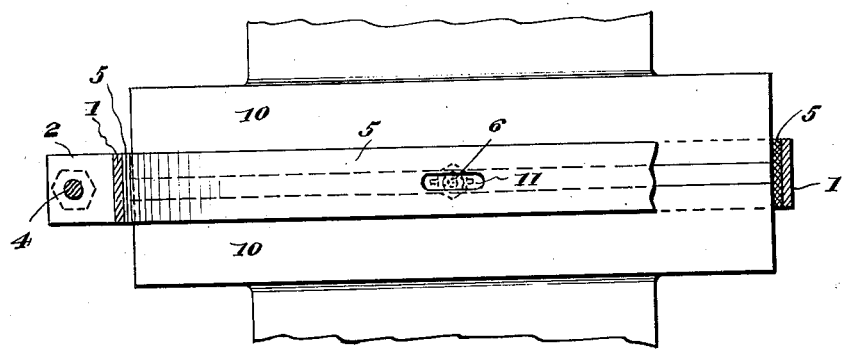
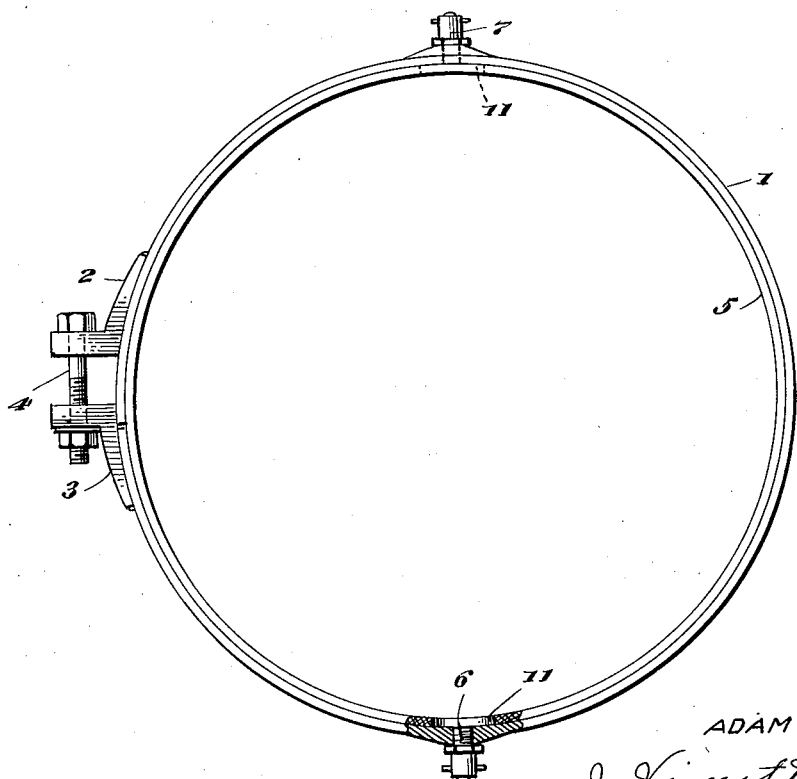
Inventor
ADAM HENDERSON Patented Feb. 3, 1942

2,271,549

UNITED STATES PATENT OFFICE 2,271,549

PIPE JOINT PROTECTOR

Adam Henderson, Houston, Tex., assignor to McEvoy Company, Houston, Tex., a corporation of Texas Application August 15, 1940, Serial No. 352,715

3 Claims. (Cl. 285—1)

This invention relates to a pipe joint protector or band adapted to be placed around a flanged joint to protect the bolts between the flanges as well as the flanges themselves from corrosion.

Many fittings used in the oil field and particularly on oil well heads and Christmas trees are of the familiar flanged type. In such fittings there is, of course, a sealing ring interposed between the flanges and outwardly from the ring the flanges are provided with perforations through which are passed bolts, which hold the flanges together and form a seal between the flanges and the sealing ring.

Many wells are so located that they are exposed to corrosive influences and this is particularly true of those wells which are located in salt water. There have recently been a large number of wells actually drilled in the water and vast oil fields are known to exist not only in tide or salt water locations, where the ground is covered part of the time with tidewater, but also considerable distances out in the sea.

Under such circumstances the salt water and spray will enter between the flanges of flanged fittings and will cause corrosion both of the flanges themselves and of the bolts which hold them together. Unless the sealing ring is made of a non-corrosive material, the sealing ring may also be corroded. It has been found that in some cases flanged fittings so located have been so corroded that the bolts between the flanges had a cross section less than one-half the diameter of their original cross section. This is, of course, very dangerous and it involves considerable expense, danger, delay and lose of production to replace such bolts.

The present invention is intended to prevent this condition and comprises a band which is placed around the flanged fitting to bridge the space between the flanges and keep out corrosive substances. The structure of this band will be apparent from the accompanying drawing in which Fig. 1 is an elevation, partly in section, of a pipe joint with the protector applied thereto;

Fig. 2 is a plan of the protector.

Referring specifically to the drawing, 1 indicates a split band of non-corrosive metal the ends of which are provided with ears 2 and 3 connected by a bolt 4 whereby the band may be clamped around the flanges 10 of a pipe joint, covering the space between the flanges which as stated is usually provided with a sealing ring. The band 1 is provided or lined on the inner side with a strip 5 of neoprene, rubber, or other elastic material which will form a seal by contact with the edges of the flanges 10, and extend across the joint. The strip 5 has slots 11 registering with nipples 6 and 7 tapped into the band 1, preferably at opposite sides of the band. These nipples may be the ordinary Alemite fittings used to supply grease under pressure. Neoprene is an artificial rubber, which is capable of resisting the action of oil better than natural rubber and is, therefore, very suitable for the intended purpose.

In use, the ring is first placed about the joint and tightened. One of the grease fittings is then removed and a pressure grease gun is applied to the other fitting. Grease is forced in until it runs out through the hole where the fitting has been removed. This fitting is then replaced and still more grease pressure is applied until the grease forces itself out between the band and the flanges all around the joint. The space between the flanges will thus be filled with grease and will be by this means additionally protected from corrosion.

It will be seen that the protector comprises a band with an elastic lining which bridges the joint and forms a seal with both of the flanges, and the space between the flanges, inside the band, may be filled with grease or other corrosion resisting substance under pressure, in the manner described. This protects flanged joints, bolts and ring gaskets from any corrosion or failure incident to the action of salt water, sulphur compounds or gas or any other corrosive substance.

Having described my invention, I claim:

1. A device to protect a flanged pipe joint from corrosion, comprising a flexible band clamped around the adjacent pipe flanges and bridging the joint, said band having a yieldable lining forming a seal with both flanges and holding said band from contact with said flanges, the band also having means for filling the space between the said lining and the said flanges with plastic under pressure.

2. A device to protect a flanged pipe joint from corrosion, comprising a flexible band clamped around the adjacent pipe flanges and bridging the joint, and having a yieldable lining forming a seal with both flanges and holding said band from contact with said flanges, the band and lining having openings and pressure inlet fittings at said openings, for admitting plastic or the like.

3. In combination, for the protection of a flanged joint, a flexible band clamped around the adjacent pipe flanges and bridging the joint, and having a yieldable lining forming a seal with both flanges and holding said band from contact with said flanges, and a protective material under pressure filling the space between said lining and said flanges.

ADAM HENDERSON.